March 31, 1925. 1,531,314
M. SIMBERG ET AL
FOOD CUTTER
Filed Oct. 22, 1924 2 Sheets-Sheet 2
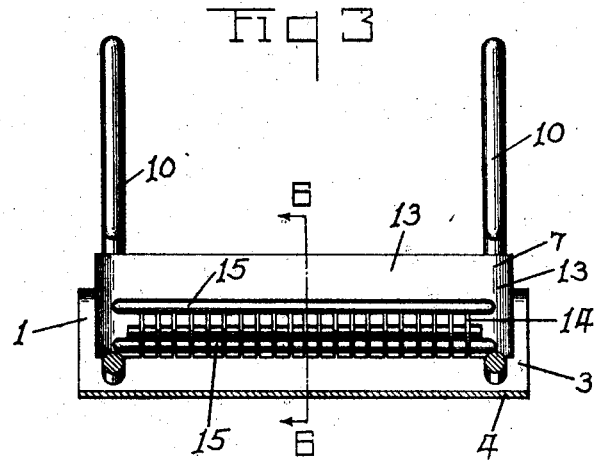
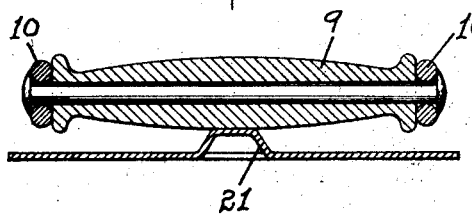
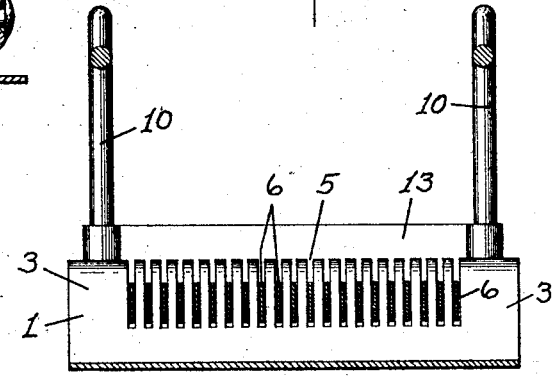
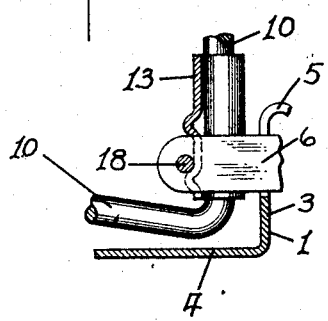
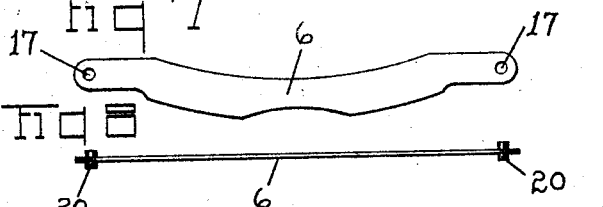

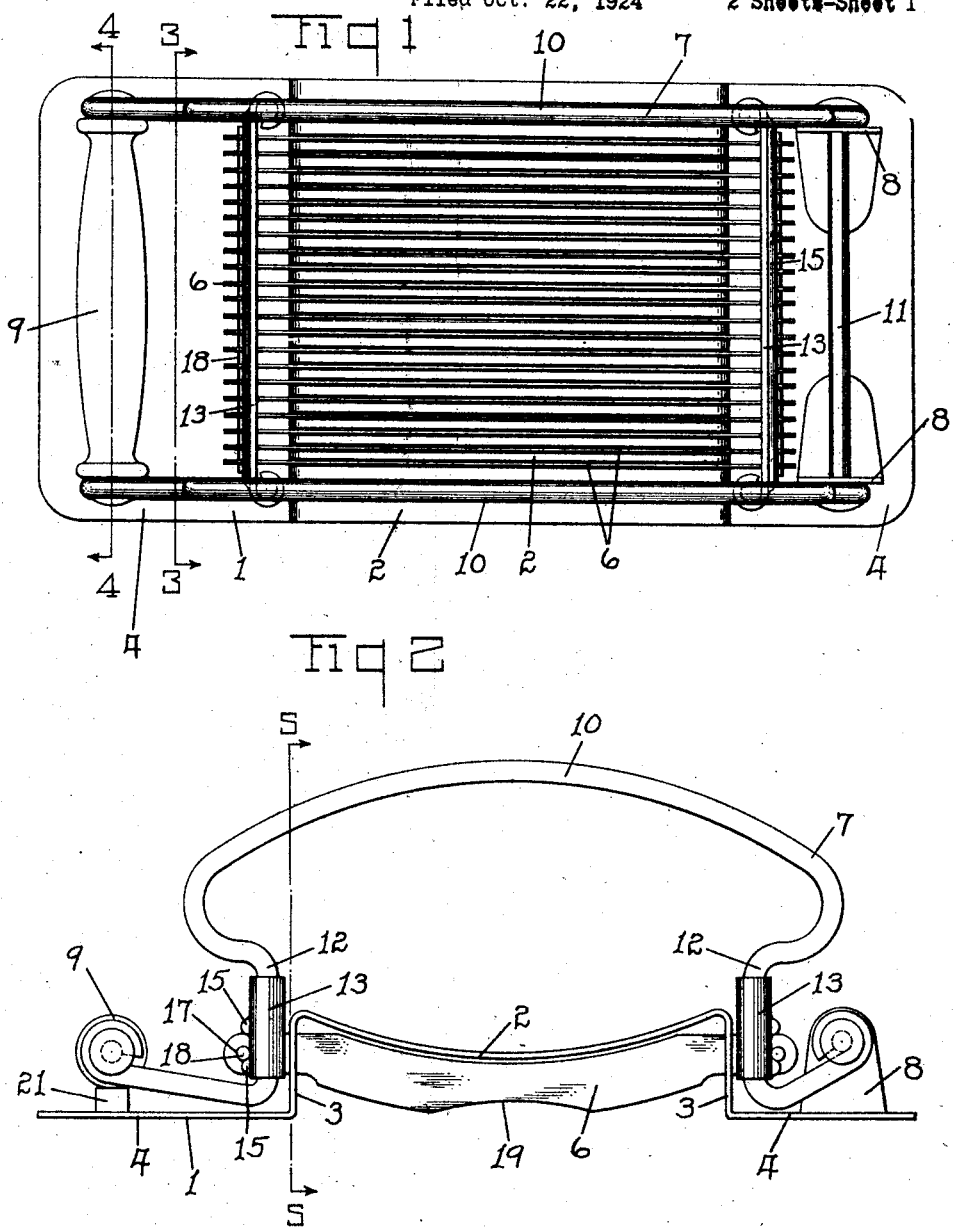

Patented Mar. 31, 1925.

1,531,314

UNITED STATES PATENT OFFICE.

MORRIS SIMBERG AND SIDNEY L. KLEIN, OF CLEVELAND, OHIO.

FOOD CUTTER.

Application filed October 22, 1924. Serial No. 745,079.

*To all whom it may concern:*

Be it known that we, MORRIS SIMBERG and SIDNEY L. KLEIN, citizens of the United States, and residents of Cleveland, in the county of Cuyahoga and State of Ohio, have invented a new and useful Food Cutter, which invention is fully described in the following specification.

Our invention has for its object to provide a food cutter having a plurality of separately removable blades. It particularly relates to that class of utensils commonly used for shredding and forming food into cubes and other shapes, for rendering food attractive and appetizing. It is adapted for use in preparing salads and relishes, croutons, and other decorative delicacies for soups, meats, and in fact for foods of all kinds. In the preferred form of embodiments of the invention the cutting knives may be readily replaced and spaced apart as may be desired to produce different widths of food portions. Moreover the knives used and the food supporting member are preferably so constructed as to prevent the food from slipping endwise with respect to the knives when the knives operate to cut the food.

The invention may be contained in food cutters which in their details vary. To illustrate a practical application of the invention we have selected a food cutter embodying the invention and shall describe it hereinafter. The structure selected as an example is a preferred form of the invention and is shown in the accompanying drawings.

Figure 1 of the drawings is a top view of the food cutter. Figure 2 is a side view of the food cutter. Figure 3 is a view of a section taken on the plane of the line 3—3 indicated in Fig. 1. Figure 4 is a view of a section taken on the plane of the line 4—4 also indicated in Fig. 1. Figure 5 is a view of a section taken on the plane of the line 5—5 indicated in Fig. 2. Figure 6 is a view of a section taken on the line 6—6 indicated in Fig. 3. Figure 7 is a side view of a blade. Figure 8 is a top view of a modified form of a blade that may be used in the cutter shown in the other figures.

Our invention provides an exceedingly simple and efficient means whereby food may be severed or shredded by producing a plurality of parallel cuts across the food. A food supporting member may be used in connection with the cutter in order that the food may be completely severed. In the form of construction shown in the drawings, the food supporting member 1 is provided with a downwardly arched portion 2 on which the food to be cut may be placed. The downwardly arched portion operates to hold the food in position and to prevent it from sliding endwise with respect to the blades when the blades are pressed downward to cut the food. The food supporting member 1 is provided with upwardly extending parts 3 that raise the arched portion 2 well above a table on which the cutter may be placed. It also is provided with laterally extending parts 4 that form a base for supporting the cutter. The food supporting member 1 is provided with a plurality of slots 5 for receiving the blades of the cutter. The slots extend the length of the arched portion 2 and part way down along the upright parts 3, as shown in Figure 5.

The blades 6 are connected to a pivoted knife blade supporting part 7. The knife blade supporting part 7 is pivotally supported on the food supporting member 1 by means of ears 8 that protrude from one of the base parts 4 that are so located as to direct the blades 6 into the slots 5 of the food supporting member 1 when the blade supporting part is swung down to cut the food. In order to manipulate the blade supporting part 7, it may be provided with a handle 9 that may be raised and lowered in the cutting operation.

The blade supporting part is provided with two arched elastic members 10 that are bent to receive the pintle 11 that extends through the ears 8 and the handle 9 and have two upwardly extending parts 12 that are located, when the cutter is in its lowermost position, substantially parallel to the upright parts 3 of the food supporting member 1, the said parts 12 being spaced sufficiently to permit free movements of the blade supporting part 7 and so as to clear the food supporting member 1 when oscillated on the pintle 11. Cross members 13, preferably formed of sheet metal, connect the parts 12 of the arched members 10 at opposite ends of the cutter. The sheet metal cross members are provided with slots 14 whereby the ends of the blades 6 may be placed in the cross members 13. The cross members 13 are also provided with ridges 15 that may be raised from the body portion of each of the cross members. One of the ridges 15 is located near the lower edge of each cross member and the other ridge 15 is located at the upper ends of the slots 14. The ridges 15, particularly the upper ridge, operates to stiffen the cross member while the lower ridge 15 forms a means for retaining the blade 6 in position in the knife blade supporting part.

The blades 6 may be provided with openings 17 at their ends for receiving the pins 18 that may extend substantially the length of the cross members 13 to engage the blades 6. The pins 18 being located between the ridges 15, they are securely held in position. Individual cross pins may be permanently secured to each of the blades 6 and may extend a short distance on each side of the slot in which each blade is located and the blades will thus be held in position individually. The blade used in the first form of construction is shown in Figure 7, while the latter form of construction is shown in Figure 8.

The blades are held in engaging relation to the lower ridges 15 and in the slots 14 by the elasticity of the arched members 10. The arched members 10 are preferably formed of elastic wires that are so shaped that they elastically engage the pins 18 and draw on the ends of the blades to hold the blades 6 in their respective positions relative to the knife blade supporting part 7.

The blades may be readily removed by merely raising the handle 9 and pressing it downwards towards the pintle 11, which will spring the arched members 10 and loosen then engagement with the pins 18 that extend through the blades. If the pins 18 have a length substantially the same as the length of the cross members 13, they may be withdrawn, which will permit the blades to fall or be removed from the blade supporting part. If the blade supporting part is turned over so as to still support the blades in the slots of the cross members 13, the blades will still be held in their positions and as many blades removed as may be desired when the pins 18 are withdrawn. Thus alternate or as many intermediate blades may be removed as may be desired, according to the widths of food that it is desired to form, and the pins 18 may be re-inserted through the blades when the elastic members 10 have been bent sufficiently to permit the pins 18 to pass through the openings 17 formed in the ends of the blades.

Where the blades are provided with short pins 20 that extend but short distances on each side of the blades and so that the pins or studs 20 may be placed end to end, the blades may be removed by merely pressing the handle 9 towards the pintle 11 and by picking off as many of the blades as may be desired. Likewise the blades may be inserted in position by replacement of the blades so that the pins or studs 20 will be engaged by the cross members above the lower ridge 15.

In order to prevent the food from slipping endwise with respect to the blades, particularly for preventing the food that is piled in convex form on the food supporting member 1 from moving endwise with respect to the blades when the blade supporting part is depressed to cut the food, the edges of the blades are provided with re-entrant curved parts 19 which prevents lateral movement of the food that is placed on the arched portion 2 of the food supporting member 1.

If desired, a raised portion 21 may be located on one of the base parts 4 of the food supporting member 1 to raise the handle 9 above the base and maintain it normally in position such that it may be readily grasped when the cutter is about to be operated.

We claim:—

1. In a food cutter, an elastic knife blade supporting part and a plurality of blades removably connected to the supporting part by the elasticity of the supporting part.

2. In a food cutter, a food supporting member, a knife blade supporting part having arched elastic side members, a plurality of blades elastically secured by the arched members.

3. In a food cutter, a food supporting member, a knife blade supporting part having arched elastic side members, cross members connected to the ends of the arched members, a plurality of blades elastically secured by the arched members and removably connected to the cross members.

4. In a food cutter, a food supporting member, a knife blade supporting part having arched elastic side members, a plurality of blades elastically secured by the arched members, the food supporting member having a plurality of slots for receiving the blades.

5. In a food cutter, a downwardly arched food supporting member, a knife blade supporting part having arched elastic side members, a plurality of blades elastically secured by the arched members, the food supporting member having a plurality of slots for receiving the blades.

6. In a food cutter, a downwardly arched food supporting member, a knife blade supporting part having arched elastic side members, a plurality of blades elastically secured by the arched members, the connecting edges of the blades having a curved reentrant part.

7. In a food cutter, a food supporting member arched downwardly and having slots, a knife blade supporting part having arched elastic side members, a plurality of blades adapted to pass through the said slots and having transversely extending studs, cross members having slots for receiving the ends of the blades and having recesses for engaging the studs, the said cross members connected to the ends of the elastic arched members and the blades secured in position by the studs and the recesses and the elasticity of the arched members.

In testimony whereof we have hereunto signed our names to this specification.

MORRIS SIMBERG.
SIDNEY L. KLEIN.